United States Patent Office 3,766,276
Patented Oct. 16, 1973

3,766,276
PHENOL ALKYLATION PROCESS
Lloyd E. Goddard, Orangeburg, S.C., assignor to Ethyl Corporation, Richmond, Va.
No Drawing. Filed Mar. 16, 1970, Ser. No. 20,158
Int. Cl. C07c 39/06
U.S. Cl. 260—624 R   8 Claims

ABSTRACT OF THE DISCLOSURE

Phenols are orthoalkylated by reaction with an olefin in the presence of an aluminum phenoxide at 100–500° C. The olefin has the structure:

R—CH=CH—R in which R is a $C_{1-50}$ alkyl, a $C_{6-20}$ aryl, or hydrogen. The product is an ethyl or o-sec-alkyl phenol and is recovered by distilling the alkylated phenols directly from the alkylation mixture without hydrolyzing the catalyst. The residue can then be recycled as the catalyst. The distillate is fractioned to recover product. Di-o-alkylated phenols can be recycled to the alkylation reaction where they serve to transalkylate the starting phenolic reactant.

BACKGROUND

A process for orthoalkylating phenols by reacting a phenol with an olefin in the presence of an aluminum phenoxide catalyst is described by Ecke et al. in U.S. 2,831,898. The same process is described further by Kolka et al. in J. Org. Chem., 22, No. 6, page 642 (1957). Following the alkylation, the orthoalkylphenol product is recovered by hydrolyzing the alkylation mixture to destroy the aluminum phenoxide catalyst and then distilling out the product.

SUMMARY

It has now been found that when the olefin used in the Ecke et al. process is ethylene or an olefin, which will lead to the introduction of a secondary alkyl group, the product can be recovered from the final alkylation mixture by distillation without destroying the aluminum phenoxide catalyst. This not only eliminates the hydrolysis step and the problems attendant with handling hydrated aluminum hydroxide but, in addition, allows the recycle of the distillation bottoms to a subsequent orthoalkylation process where it acts as the aluminum phenoxide catalyst.

DESCRIPTION OF THE PREFERRED EMBODIMENTS

A preferred embodiment of the invention is an improvement in a process for orthoalkylating a phenol, said phenol having at least one nuclear position ortho to the phenolic hydroxyl group unsubstituted except for hydrogen, said process comprising reacting said phenol with an olefin, said olefin having the structure:

R—CH=CH—R wherein each R group is independently selected from the group consisting of hydrogen, $C_{1-50}$ alkyl radicals and $C_{6-20}$ aryl radicals, in the presence of an aluminum phenoxide catalyst at a temperature of from 100–500° C. to form an o-ethylphenol or an o-sec-alkylphenol, the improvement whereby alkylated phenols containing said o-alkylphenol are separated from the resultant alkylation mixture by distillation of said alkylated phenols from said alkylation mixture without hydrolyzing said aluminum phenoxide catalyst and at reduced pressure such that the temperature of said alkylation mixture does not substantially exceed the dealkylation temperature of said o-alkylphenols during said distillation.

The useful phenols are adequately described in U.S. 2,831,898, incorporated herein by reference. Briefly, these are hydroxy aromatic compounds wherein at least one nuclear position ortho to the phenolic hydroxyl group is unsubstituted except for hydrogen. A few representative examples are:

phenol
o-cresol
p-cresol
p-methoxyphenol
p-chlorophenol
o-chlorophenol
2,4-dichlorophenol
2,4-dibromophenol
p-phenylphenol
p-(α,α-dimethylbenzyl)phenol
2,4-di(α-methylbenzyl)phenol
p-tert-butylphenol
2,4-diisopropylphenol
p-sec-eicosylphenol
p-sec-triacontylphenol
p-sec-tetracontylphenol
p-sec-pentacontylphenol
m-cresol
m-isopropylphenol
p-cyclohexylphenol
p-(4-tert-tetradecylphenyl)phenol
o-ethoxyphenol
α-naphthol
β-naphthol
7-hydroxyindene
5-hydroxyacenaphthene
2-hydroxyfluorene
α-hydroxyanthracene
1-hydroxyphenanthrene
1-hydroxychrysene
2-hydroxypyrene
2-hydroxytriphenylene and the like.

Although a wide range of olefins can be used to orthoalkylate phenol according to the process of U.S. 2,831,898, not all are useful when one desires to take advantage of the improvements offered by the present invention. In essence, the olefins used should be those that lead to primary or secondary alkyl substitution. The term "alkyl" is used in a broad sense and includes those alkyls which are substituted with groups that do not affect the primary or secondary alkyl nature of the group and do not interfere with the alkylation process such as by interacting with the catalyst or with the phenolic reactants. The preferred olefins are those having the structure:

R—CH=CH—R wherein each R group is independently selected from the group consisting of hydrogen, $C_{1-50}$ alkyl radicals, and $C_{6-20}$ aryl radicals. The more preferred olefins are those having the above structure wherein each R group is independently selected from hydrogen and $C_{1-4}$ alkyl radicals. The most preferred olefins are monoolefinically unsaturated hydrocarbons.

Some examples of useful olefins are:

ethylene
propylene
butene-1
butene-2
3-methylpentene-1 eicosene-1
eicosene-2
dodecene-1
dodecene-2
styrene and the like.

The improved process is most beneficial when the alkylating olefin is propylene or n-butene (either butene-1 or butene-2, or mixtures thereof).

The aluminum phenoxide catalyst is a compound having at least one phenoxide group bonded to an aluminum atom. The phenoxide radicals may be derived from phenol itself or from any phenolic compound such as the particular phenol being alkylated. For example, if the phenol being alkylated is o-cresol, the aluminum phenoxide will have 2-methylphenoxide radicals bonded to aluminum. Furthermore, as the alkylation proceeds the nature of the aluminum phenoxide, being in dynamic equilibrium with the composition of the mixture, changes. For example, if one starts with phenol and the aluminum phenoxide is aluminum tris phenoxide, and this is alkylated with, for example, butene-1, there will exist, as the reaction proceeds, a quantity of aluminum phenoxide in which sec-alkyl groups are bonded to the phenoxide radicals. This will be especially apparent towards the end of the alkylation when the amount of free phenol is diminished.

The aluminum phenoxide can be made by a variety of methods. For example, aluminum metal, either granular or ribbon, can be heated with a phenol to about 150–200° C., causing the aluminum to react with evolution of hydrogen, forming an aluminum phenoxide. A small amount of mercuric chloride catalyzes this reaction by amalgamating the surface of the aluminum. If desired, an aluminum alkyl such as triethyl aluminum can be added to the phenol forming an aluminum phenoxide.

Generally, the aluminum phenoxide is an aluminum tris phenoxide, but this is not required. For example, the aluminum phenoxide can be made by adding aluminum chloride to the phenol and venting evolved hydrogen chloride, forming an aluminum phenoxide having the empirical formula: diphenoxy aluminum chloride. Likewise, small amounts of water in the phenol reactant result in formation of a phenoxy aluminum hydroxide such as diphenoxy aluminum hydroxide which is also an active catalyst.

The amount of aluminum phenoxide should be sufficient to cause the alkylation to proceed at a reasonable rate. Good results are achieved when from about 0.01 to 0.1 mole part of aluminum are employed in the form of an aluminum phenoxide for each mole part of phenol. A preferred concentration range is from about 0.02 to 0.04 mole part of aluminum as aluminum phenoxide per mole part of phenol.

The alkylation is conducted by adding the olefin to the phenol containing the aluminum phenoxide catalyst and heating to an alkylation temperature. Although a temperature range of from about 0–500° C. has been found to be useful depending upon the particular phenol and olefin, a more preferred range when using the olefins described above is from about 200–400° C.

The amount of olefin is not critical. Generally, from 0.1–10 moles of olefin are added per mole of phenolic reactant. With the lower olefins (e.g., ethylene, propylene, butene-1, butene-2, pentene-1, hexene-1) the amount of olefin is governed by the pressure. Olefin is merely pumped into the reaction vessel at reaction temperature until the desired pressure is reached. This is generally dictated by the equipment and can vary over a broad range. A useful pressure range is from atmospheric to 2000 p.s.i.g. A preferred range is from about 50–1000 p.s.i.g. Olefin is pumped into the alkylation vessel until the reaction ceases, as indicated by lack of pressure drop.

In the past, water or aqueous acid has been added to the final alkylation mixture after completion of the reaction and prior to distilling the alkylated phenols from the crude mixture. This initial distillation is termed a "flash distillation" and is usually a simple distillation. If a purer product is required the flash distillate can be subsequently distilled in a fractionating column or series of fractionating columns.

The purpose of adding water to the final alkylation mixture was to hydrolyze the aluminum phenoxide catalyst prior to distillation to prevent dealkylation. Aluminum phenoxides are known to also cause dealkylation of alkylated phenols, as reported by Kolka et al., J. Org. Chem., 22, No. 6, page 646 (1957) and British 940,378. It has now been found that when the ortho-alkyl groups on the phenol are primary or secondary the product can be recovered from the crude alkylation mixture by a direct distillation without hydrolysis to yield a distillate containing unreacted phenols and alkylated phenols from which the desired ortho-primary or secondary alkylphenols can be recovered by fractionation. This is accomplished by conducting the flash distillation at a reduced pressure such that the alkylation mixture does not substantially exceed the dealkylation temperature of the ortho-primary or secondary alkylphenol. By "not substantially exceed" is meant that during the main part of the flash distillation the temperature should be kept below the dealkylation temperature but that it may extend for brief periods, especially towards the end of the distillation, into tered. Dealkylation is readily detected by the presence of evolved olefin.

The dealkylation temperature depends to some extent on the particular orthoalkylphenol. In general, it has been found that the flash distillation can be conducted without substantial dealkylation if the liquid temperature of the alkylation mixture is maintained below about 225° C.

The boiling temperature of the alkylation mixture is readily controlled by adjusting the pressure. Depending upon the boiling point of the particular orthoalkylphenol, it is generally acceptable to conduct the reduced pressure flash distillation at about 10–200 mm. Hg. A particularly useful range when the phenolic reactant is phenol itself and the alkylating olefin is a lower $C_{2-6}$ olefin is from about 25–100 mm. Hg. A particularly facile method to conduct the flash distillation is to start at the highest pressure at which there is substantially no dealkylation and to continually reduce the pressure as the temperature of the alkylation mixture starts to rise into the dealkylation range.

Following the flash distillation, the residue or bottoms can be merely discarded. It has been found, however, that their effectiveness as an orthoalkylation catalyst has not been substantially diminished. Hence, in a particularly preferred embodiment the residue remaining after distilling the alkylated phenol from the alkylation mixture is recycled to a subsequent orthoalkylation process conducted in the same manner previously described. If the cycle is continuously repeated it may be necessary to replenish diminished catalyst activity by adding some additional aluminum phenoxide. This is readily accomplished by adding a small amount of aluminum or aluminum alkyl to the phenolic reactant at the start of the alkylation reaction and then heating to form the aluminum phenoxide as described in U.S. 2,831,898. In general, the amount of additional aluminum added in this manner is less than about one-quarter that normally required to effect the same alkylation rate in the absence of the recycled bottoms.

In another embodiment of the invention especially useful when the desired product is a mono-orthoalkylated phenol still having one unsubstituted ortho position, not only are the alkylated phenols flash distilled from the catalyst without hydrolysis but, after fractionation of the flash distillate to recover a mono-orthoalkylphenol (e.g., o-sec-butylphenol), the remaining polyalkylated phenols, which consist mainly of diorthoalkylated phenols (e.g., 2,6-di-sec-butylphenol), are recycled to a subsequent alkylation where they are mixed with the original starting phenolic material and an aluminum phenoxide catalyst which can be the flash distillation bottoms. This mixture is heated to a temperature of about 200–300° C. in the closed alkylation vessel whereby a substantial amount of the alkyl groups on the di-orthoalkylated phenols are transalkylated to the original phenolic starting material. The transalkylation is illustrated in its simplest form by the following equation.

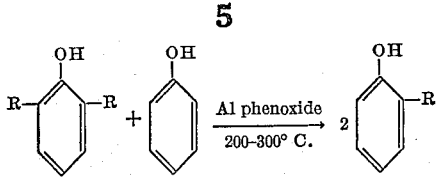

In the above transalkylation portion of the process the polyalkylated phenols after fractionation to remove the orthoalkylphenol act as donor phenols, that is, they donate alkyl radicals to the original phenolic starting material. The amount of donor phenol is controlled by the amount of higher alkylated phenols formed in the original alkylation process. In general, from about 0.001 to 10 moles of donor phenol can be utilized per mole of recipient or starting phenol. Preferably, the recipient phenol is in molar excess. In other words, a more preferred range is from about 0.001 to 1 mole of donor phenol per mole of recipient phenol.

The amount of aluminum phenoxide used for the transalkylation procedure is the same as that used during the subsequent alkylation procedure. Good results are achieved when from about 0.01 to 0.1 mole part of aluminum are present as an aluminum phenoxide for each mole part of phenol including both donor and recipient. A preferred catalyst range is from 0.02–0.04 mole part of aluminum as aluminum phenoxide per mole part of phenol. After the initial alkylation the major portion of the aluminum comes from recycle of the flash distillation bottoms. A minor part may be added after each recycle by such means as adding aluminum metal or an aluminum alkyl in order to maintain the desired catalyst level.

The transalkylation can be conducted in a temperature range of from about 100–500° C. The preferred temperature range is from about 200–300° C., especially about 225–275° C.

The transalkylation is conducted in a closed system to prevent olefin and phenol from escaping and to give a higher transalkylation yield. The donor and recipient phenol plus the catalyst (e.g., flash distillation bottoms) are merely mixed and heated in the closed system allowing the pressure to seek its level under the particular conditions. In a more preferred embodiment olefin corresponding in structure to the transalkylating alkyl group (R in the previous equation) is added to further minimize the amount of escaping olefin. By corresponding in structure is meant having the same structure that the migrating alkyl would have if removed from the donor phenol and an olefinic double bond placed between the carbon atom formerly bonded to the phenol ring and an adjoining carbon atom. A few examples of representative alkyls and corresponding olefins are as follows: isopropylpropylene; sec-butyl-butene-1 or butene-2; 1-methylundecyl-dodecene-1 or 2. The amount of supplemental olefin pressure can vary over a wide range such as from about 50–1000 p.s.i.g.

The following examples serve to illustrate the manner in which the process is conducted. All parts are by weight unless otherwise stated.

Example 1

In a pressure reaction vessel equipped with stirrer, heating means and means for introducing propylene under pressure was placed 453 parts of phenol and 3.9 parts of granular aluminum. The vessel was flushed with nitrogen and, while stirring, heated to 180° C., at which temperature a reaction initiated, forming aluminum phenoxide and causing the temperature to increase to 214° C. The mixture was then cooled and vented. While stirring, the phenol containing the aluminum phenoxide was heated at 230° C., at which point propylene feed was commenced. Propylene was added until the pressure increased to 400 p.s.i.g. Alkylation was continued at 230–238° C. and 100–400 p.s.i.g. for 2 hours. Following this, the alkylation ceased, as indicated by lack of propylene absorption. The vessel was cooled and vented. The contents were transferred to a distillation vessel taking care to minimize contact with air or moisture. The pressure in the distillation vessel was reduced to 60 mm. Hg and heat was applied. While maintaining the pressure at about 50 mm. Hg, the temperature of the liquid alkylation mixture was gradually increased to 200° C., during which period alkylated phenols distilled and were cooled. No dealkylation was detected. The distillate was transferred to a fractionating column and fractionated to recover 175.7 parts of unreacted phenol, 229 parts of o-isopropylphenol and 95 parts of 2,6-diisopropylphenol.

Example 2

First alkylation.—In the pressure vessel of Example 1 was placed 454 parts of phenol and 3.9 parts of flake aluminum. Aluminum phenoxide catalyst was formed as before. The phenol was heated to 233° C. and propylene pumped in until the pressure reached 400 p.s.i.g. Alkylation was continued under these conditions for 2 hours, at which time the vessel was cooled and vented. The contents were transferred to a distillation vessel and the mixture distilled at a reduced pressure of 50 mm. Hg. Distillate started coming over when the liquid alkylation mixture reached 120° C. and the distillation was continued until the distillation bottoms were at 202° C. The distillate weighed 540.5 parts and was analyzed by gas chromatography and found to contain 34 weight percent phenol, 45 weight percent o-isopropylphenol and 21 weight percent 2,6-diisopropylphenol.

Alkylation using recycle bottoms.—The bottoms from the above flash distillation were placed back in the pressure reaction vessel together with 414 parts of phenol. The pressure vessel was sealed and heated to 229° C., at which temperature propylene feed was commenced until the pressure reached 400 p.s.i.g. Alkylation was continued for 2 hours at about 230° C. and the alkylation mixture was then cooled and the vessel vented. The contents were transferred to a distillation vessel and the alkylation mixture distilled at a reduced pressure of 50 mm. until the liquid alkylation bottoms reached a temperature of 200° C. The distillate removed weighed 549.6 parts and analyzed by gas chromatography 34 weight percent phenol, 44 weight percent o-isopropylphenol and 22 weight percent 2,6-diisopropylphenol. This demonstrates that the flash distillation residue is an effective orthoalkylation catalyst having about the same activity as the original aluminum phenoxide.

Second alkylation using recycle bottoms.—The flash distillation bottoms from the above procedure were placed back in the pressure reaction vessel together with 414 parts of phenol. An alkylation was conducted employing propylene under the same conditions as above. The alkylation proceeded substantially the same. Following the alkylation the vessel contents were transferred to a simple distillation vessel and distilled at a reduced pressure of 50 mm. up to a liquid bottoms temperature of 185° C. Total distillate was 558.2 parts which was analyzed by gas chromatography and found to contain 33 weight percent phenol, 45 weight percent o-isopropylphenol and 23 weight percent 2,6-diisopropylphenol.

Third alkylation using recycle bottoms.—The flash distillation bottoms from the previous procedure was placed in the pressure reaction vessel together with 414 parts of phenol. The vessel was sealed and the phenol alkylated with propylene in the same manner as before. Following this, the contents were transferred to a distillation vessel and distilled at 53 mm. Hg up to a liquid bottoms temperature of 172° C. The distillate weighed 547.8 parts and was analyzed by gas chromatography and found to contain 35 weight percent phenol, 43 weight percent o-isopropylphenol and 19 weight percent 2,6-diisopropylphenol.

The following table summarizes the results obtained using the recycle catalyst.

|  | Original alkylation | First recycle | Second recycle | Third recycle |
|---|---|---|---|---|
| Amount | 540.5 | 549.6 | 558.2 | 547.8 |
| Percent phenol | 34 | 34 | 33 | 35 |
| Percent o-isopropylphenol | 45 | 44 | 45 | 43 |
| Percent 2,6-diisopropylphenol | 21 | 22 | 23 | 19 |

From the above, it is apparent that the improvement provided by this invention has the valuable added feature of allowing catalyst recycle which eliminates the necessity of preparing a new aluminum phenoxide catalyst for each alkylation and avoids the hazard associated with the hydrogen evolved in catalyst preparation.

Example 3

In the pressure reaction vessel of Example 1 place 94 parts of pehnol and 0.6 part of granular aluminum. Heat to 180° C. to form an aluminum phenoxide catalyst. Cool and vent hydrogen. Seal and heat to 230° C. Pressurize with n-butene-1 to 700 p.s.i.g. and stir for 2 hours at 230–240° C. Cool and vent. Transfer the mixture to a flash distillation vessel and heat to 180° C. Hold liquid temperature at 180° C. and gradually reduce pressure while distilling out phenol and alkylated phenol. When the pressure reaches 30 mm. Hg, cool the distillate bottoms to 100° C. and transfer them back to the pressure reaction vessel, being careful to exclude air and moisture. Fractionate the distillate to recover phenol and o-sec-butylphenol in separate fractions, leaving fractionation bottoms containing 2,6-di-sec-butylpenol plus some 2,4-di- and 2,4,6-tri-sec-butylphenols. Add sufficient phenol to the phenol distillate fraction to make 94 parts and transfer this to the pressure vessel containing the recycled flash distillation bottoms. Seal and heat to 230° C. and pressurize with n-butene-1 to 700 p.s.i.g. Carry out the butylation in the same manner as previously and recover product using flash distillation with bottoms recycle followed by fractionation of the flash distillate.

Example 4

In a pressure reaction vessel as in Example 1 carry out the butylation of phenol with n-butene-1 in the manner of Example 3. Recycle the flash distillation bottoms, the phenol fraction and also the bottoms from the fractional distillation to the pressure vessel. Add make up phenol to bring the total phenol in the pressure vesesl to 94 parts. Seal the pressure vessel and heat to 240° C. Stir at this temperature for 30 minutes to transalkylate a portion of butylated phenols forming a quantity of o-sec-butylphenol. Then pressurize with n-butene-1 to 500 p.s.i.g. and continue alkylating for 90 minutes. Cool and transfer to the flash distillation vessel. Reduce the pressure to 50 mm. and flash distill until the liquid bottoms reach 180° C. Transfer the flash distillation bottoms back to the pressure reaction vessel and fractionate the flash distillate to recover phenol and o-sec-butylphenol. Recycle the fractionated phenol and also the fractionation bottoms to a subsequent alkylation carried out in the same manner as above and continually repeat this cycle. This procedure results in a very high yield of o-sec-butylphenol.

In the above example other phenols having an unsubstituted ortho position can be used in place of phenol itself. For example, o-cresol can be used when the desired product is 6-sec-butyl-o-cresol. Likewise, other olefins can be used to give the corresponding orthoalkylated product. For example, cyclohexene gives a mixture of o-cyclohexyl and 2,6-dicyclohexylphenol. Depending upon which is the desired product, the other can be recycled. When the o-cyclohexylphenol is the desired product the 2,5-dicyclohexylphenol is recycled to the pressure vessel, mixed with phenol and flash distillation bottoms and a transalkylation conducted, followed by a conventional alkylation. When the 2,6-dicyclohexylphenol is the desired product the o-cyclohexylphenol plus any unalkylated phenol is recycled to the pressure vessel together with the flash distillation bottoms and alkylated with cyclohexene. When styrene is used in the process the product is a mixture of o-(α-methylbenzyl)phenol and 2,6-di-(α-methylbenzyl)phenol. The yield of the desired product can be maximized in the maner just described.

Example 5

In this example the desired product is 2,6-diisopropylphenol. The first phenol alkylation is conducted as in Example 1 except the alkylation period is extended to 3 hours. The vessel contents are flash distilled at 50 mm. Hg up to a liquid temperature of 290° C. The flash distillate is then fractionated to obtain a first fraction containing phenol and o-isopropylphenol and a second fraction containing essentially 2,6-diisopropylphenol. The flash distillation bottoms and the first fraction are both recycled to the pressure alkylation vessel. Then one part of triethyl aluminum is added to increase the amount of aluminum phenoxide and assure a high level of continued catalytic activity. The second alkylation is then conducted in the same manner as the first and this cycle continuously repeated, giving a very high yield of 2,6-diisopropylphenol based on consumed phenol.

Other phenolic compounds and olefins can be substituted in the above example with good results. For example, p-cresol leads to 2,6-diisopropyl-p-cresol. Likewise, use of dodecene-1 forms o- and 2,6-di-(1-methylundecyl)phenol.

The orthoalkylated phenols produced by this procedure are useful as antioxidants and as chemical intermediates. For example, the process can be employed to produce o-isopropylphenol, which is an effective antiskinning agent for paints. In this use it is aded to an oil base paint in amounts of about 0.1 weight percent. Ortho-sec-butylphenol made by this process is readily nitrated by the procedure described in U.S. 2,810,767 to produce the very effective herbicide 4,6-dinitro-o-sec-butylphenol. This can be formulated and used by well-known methods to control undesirable vegetation as shown in U.S. 2,365,056; U.S. 2,392,859 and U.S. 2,833,639.

I claim:

1. In a process for orthoalkylating a phenol, said phenol having at least one nuclear position ortho to the phenolic hydroxyl group unsubstituted except for hydrogen, said process comprising reacting said phenol with an olefin, said olefin having the structure:

$$R-CH=CH-R$$

wherein each R group is independently selected from the group consisting of hydrogen, $C_{1-50}$ alkyl radicals and $C_{6-20}$ aryl radicals, in the presence of aluminum phenoxide catalyst at a temperature of from 100–500° C. to form an o-alkylphenol, and distilling the alkylated phenols containing said o-alkylated phenol from the resulting alkylation mixture without hydrolyzing said aluminum phenoxide catalyst by conducting said distillation under a reduced pressure, the temperature of said alkylation mixture does not substantially exceed the dealkylation temperature of said o-alkylphenol during said distillation the improvement whereby the residue remaining after distilling said alkylated phenols from said alkylation mixture is recycled to a subsequent orthoalkylation process conducted in the above manner as at least a substantial portion of said catalyst.

2. A process of claim 1 wherein said phenol is the compound phenol, $C_6H_5OH$.

3. A process of claim 2 wherein said olefin is propylene.

4. A process of claim 3 wherein said distillation is conducted at a reduced pressure of from about 10–200 mg. Hg.

5. A process of claim 3 wherein said distillation is conducted at a reduced pressure such that the temperature of said alkylation mixture does not exceed about 225° C.

6. A process of claim 2 wherein said olefin is n-butene.

7. A process of claim 6 wherein said distillation is conducted at a reduced pressure of from about 10–200 mg. Hg.

8. A process of claim 6 wherein said distillation is conducted at a reduced pressure such that the temperature of said alkylation mixture does not exceed about 225° C.

References Cited

UNITED STATES PATENTS 2,800,514    7/1957    Hathaway _____ 260—624 C

BERNARD HELFIN, Primary Examiner

W. B. LONE, Assistant Examiner

U.S. Cl. X.R.

260—624 C, 624 A

UNITED STATES PATENT OFFICE
CERTIFICATE OF CORRECTION

Patent No. 3,766,276   Dated October 16, 1973

Inventor(s) Lloyd E. Goddard

It is certified that error appears in the above-identified patent and that said Letters Patent are hereby corrected as shown below:

Column 4, line 17, after "into" insert -- the region where some dealkylation might be encoun- --. Column 5, line 52, "isopropylpropylene" should read -- isopropyl - propylene --. Column 7, line 50, after "of" insert -- the phenol with the 2,6-di-sec-butylphenol and higher --; line 72, "2,5-" should read -- 2,6- --. Column 9, Claim 7, at line 8, "mg." should read -- mm. --. Column 8, Claim 4, at line 74, "mg." should read -- mm. --.

Signed and sealed this 30th day of April 1974.

(SEAL)
Attest:

EDWARD M.FLETCHER,JR.
Attesting Officer

C. MARSHALL DANN
Commissioner of Patents